Feb. 11, 1964     R. L. VAN DE MARK     3,120,924
COMBINED MARKING AND COUNTING INSTRUMENT
Filed April 11, 1960
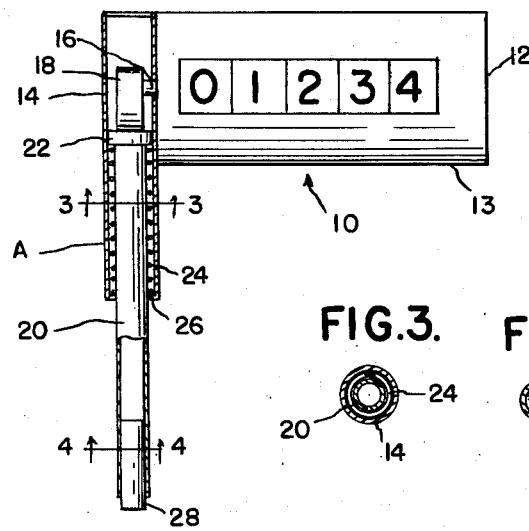
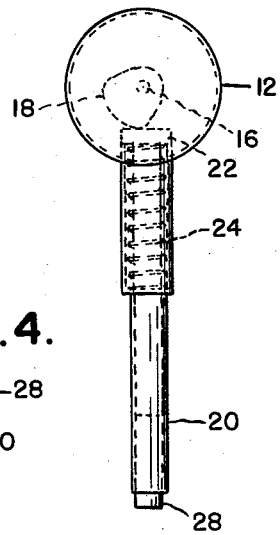
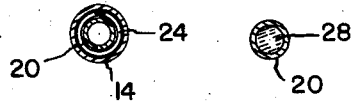
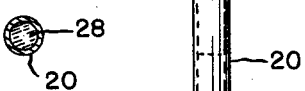
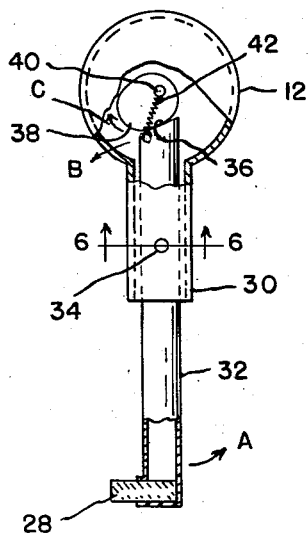
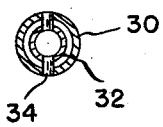
*INVENTOR.*
ROBERT L. VAN DE MARK
BY
ATTORNEYS

United States Patent Office 3,120,924
Patented Feb. 11, 1964

3,120,924
COMBINED MARKING AND COUNTING
INSTRUMENT
Robert L. Van De Mark, 700 Brown St., St. Clair, Mich.
Filed Apr. 11, 1960, Ser. No. 21,404
1 Claim. (Cl. 235—91)

This invention relates to a combined marking and counting instrument and refers more particularly to a marking and counting mechanism for use for example in production and inventory counting.

Previously when an inventory or a production count was being conducted, it was required that the person taking the inventory actually mark the items or articles and make a mental note as to how many articles were counted. After a certain number of articles had been marked and mentally recorded, as an example fifty, the person would make a permanent note thereof and start over again mentally counting the articles being marked. This procedure would be repeated until the entire inventory or production count had been completed. Some persons also mark and simultaneously mentally record the articles regardless of the number of articles to be counted. From the above description it is readily apparent that the prior art method is subject to many mental errors, particularly when a large number of items is to be counted over a long period. With the apparatus described herein, the need for mental effort has been substantially reduced.

It is an object of the present invention to provide a combination marking and counting instrument which will place a mark on the articles surveyed and in addition thereto make a permanent record of the number of articles marked.

A further object of the invention is to provide a combination marking and counting instrument which includes a counter having a counter trip and marking means adapted to mark an article while simultaneously rotating the counter trip to advance the counter one digit.

A still further object of the invention is to provide a simplified, low-cost combination marking and counting instrument of the aforementioned types having certain advantages contributing to efficiency, reliability, accuracy and long life.

FIGURE 1 is a front elevation, partly in section, of the preferred embodiment of the invention.

FIGURE 2 is a side elevation of the instrument shown in FIGURE 1.

FIGURE 3 is a section taken on line 3—3 of FIGURE 1.

FIGURE 4 is a section taken on line 4—4 of FIGURE 1.

FIGURE 5 is a side elevation, partly in section, of another embodiment of the invention.

FIGURE 6 is a section taken on line 6—6 of FIGURE 5.

The preferred embodiment of the marking and counting instrument is shown in FIGURES 1-4 and is designated by the numeral 10. The instrument 10 includes a counter 12 which has a cylindrical housing 14 on one side thereof. The cylindrical counter 12 serves as a convenient handle 13 for grasping the instrument for operation. The counter 12 includes a rotatable shaft or rod 16 which extends outwardly from the main part of the counter into the housing 14 and is adapted to carry a rotatable counter trip or cam 18. The counter trip 18 is adapted to be rotated in a manner to be hereinafter described so as to rotate the rod 16 and advance the counter 12 one digit at a time. The counter 12 is of the conventional type and need not be described in any detail. A partial rotation of the counter trip 18 will advance the counter one digit. Although five banks of numerals are shown, it should be understood that any number of banks may be utilized.

The vertically extending cylindrical housing 14 is adapted to carry a vertically movable marking holder 20 for marking means 28. The inner end of the holder 20 is adapted to move axially in the housing 14 and is provided with a shoulder or flange 22 which abuts the eccentrically mounted counter trip 18.

Spring 24 is provided in the housing 14 concentric with the holder 20 and has one end seated on the shoulder 22 and the other end abutting flanged end 26 of the housing 14. This spring serves to bias the upper end of holder 20 against cam 18.

The outer end of the marking means holder 20 is adapted to carry the marking means 28 which may be for example a pencil, pen, crayon, brush, or chalk.

The marking and counting instrument 10 is relatively simple in construction and in its operation. The instrument 10 is employed by a person who takes hold of the cylindrical counter handle 13 and brings the marking means 28 into contact with the article to be inventoried. While the mark is being placed on the article, a slight downward force applied to the cylindrical counter handle 13 moves the housing 14 downwardly with reference to the holder 20, thereby rotating the trip 18 and advancing the counter 12 one digit. In other words, the housing 14 and counter 12 move relatively to the holder 20.

It should be understood that the marking means 28 may be connected to the holder 20 in different ways. The holder 20 may be tubular, as shown, or solid. In addition, the housing 14 may be integrally formed with the counter housing.

Another embodiment is shown in FIGURES 5 and 6. A similar counter 12 is provided with the counter housing serving as the handle. However, a larger housing 30 is provided for pivotally carrying a marking means holder 32. A pivot pin 34 pivotally connects the holder 32 with the housing 30, as is seen in FIGURE 6.

The inner end of the holder 32 has a slanted surface 36 which is adapted to rotate the eccentrically mounted counter trip or cam 38 about the rod 40. The outer end of the holder 32 carries marking means 28 in a manner such that the axis of the marking means 28 is perpendicular to the axis of the holder 32. A spring 42 is connected on one end to the pivot of the counter trip 38 and on the other end to the holder 32 for returning the holder 32 to its original position after it has been displaced.

In operation, a person takes hold of the cylindrical counter handle 13 and brings the marking means 28 into contact with the article to be inventoried. While the mark is being placed on the article, a slight force rotates the holder 32 about pivot 34 in a direction, as indicated by arrows "A" and "B," so as to urge or rotate the counter trip 38 in a clockwise direction, as indicated by the arrow "C." The rotation of the counter trip 38 advances the counter one digit. After the marking and counting operations have been completed, the instrument is removed and the spring 42 returns the trip 38 and holder 32 to their original positions for subsequent operation.

This invention has provided a simple, economical and accurate instrument for simultaneously marking and counting articles to be inventoried. In addition, the counter housing provides a convenient handle for utilizing the device in operation.

The drawings and the foregoing specification constitute a description of the combined marking and counting instrument in such full, clear, concise and exact terms as to enable any person skilled in the art to practice the invention, the scope of which is indicated by the appended claim.

What I claim as my invention is:

A combined marker and counter comprising an elongated tubular housing having an opening in the bottom wall thereof which is surrounded by an inwardly extending flange, an elongated holder guided by said flange for relative lengthwise movement with respect to the longitudinal axis of said housing, said holder having an inner end portion within and spaced from the side wall of said housing and an outer end portion extending outwardly therefrom through said opening, said holder having a flange on the inner end thereof which engages said housing and guides said holder during relative lengthwise movement thereof with respect to said housing, an annular spring chamber in said housing surrounding said holder between said flanges, a marker on the outer end of said holder exterior of said housing, a counting device including an elongated casing connected to said housing at the upper end thereof, counting mechanism in said casing including a rotatable shaft which has an end extending into said housing and spaced between the upper end of said housing and the flange on said holder, said shaft and said casing being arranged substantially perpendicular to the longitudinal axis of said housing, a cam forming a rotatable counter trip eccentrically mounted on the end of said shaft within said housing, a spring in said spring chamber surrounding said holder between said flanges for urging said holder into said housing and maintaining the flange on said holder against said counter trip, the high side of said counter trip being in operative juxtaposition to the flange on said holder to provide a one-way positive acting mechanical connection therebetween for advancing the counting mechanism one digit upon the application of marking pressure, said casing serving as a handle so that a person may grip the casing and bring the marker into engagement with the goods to be marked so that marking pressure is applied to said holder in a substantially straight line with respect to said housing to rotate said counter trip and shaft and advance said counting mechanism one digit.

References Cited in the file of this patent

UNITED STATES PATENTS

| | | |
|---|---|---|
| 380,519 | Rose | Apr. 3, 1888 |
| 618,427 | Moore | Jan. 31, 1899 |
| 1,841,951 | Hopper | Jan. 19, 1932 |

FOREIGN PATENTS

| | | |
|---|---|---|
| 45,650 | Switzerland | Sept. 24, 1908 |
| 86,580 | Switzerland | Feb. 16, 1921 |